US005115389A

United States Patent [19]

Ouchi et al.

[11] Patent Number: 5,115,389

[45] Date of Patent: May 19, 1992

[54] DC POWER SUPPLY CIRCUIT ARRANGEMENT

[75] Inventors: Shigetoshi Ouchi; Tatsuji Shirouzu; Shinichi Ode, all of Hitachi; Takasi Ichinose, Ibaraki; Tutomu Kanno, Hitachi, all of Japan

[73] Assignee: Hitachi, Ltd., Tokyo, Japan

[21] Appl. No.: 577,024

[22] Filed: Sep. 4, 1990

[30] Foreign Application Priority Data

Sep. 6, 1989 [JP] Japan ................................ 1-229179

[51] Int. Cl.[5] ........................................ H02M 7/162

[52] U.S. Cl. ........................................ 363/125; 363/58; 363/70

[58] Field of Search ..................... 363/125, 53, 56, 69, 363/70, 58

[56] References Cited

U.S. PATENT DOCUMENTS 4,384,248 5/1983 Matsuda ................................ 363/58
4,805,062 2/1989 Shirouzu ................................ 361/4

*Primary Examiner*—Steven L. Stephan
*Assistant Examiner*—Adolf Berhane
*Attorney, Agent, or Firm*—Antonelli, Terry, Stout & Kraus

[57] ABSTRACT

A DC power supply circuit arrangement for supplying DC power from a power source through a common conductor to a load, comprises a plurality of switches connected between the power source and the common conductor and/or between the common conductor and the load, each of the switches having one terminal connected to the power or the load and the other terminal connected to the common conductor, an energy absorber having two terminals, a first diode connected between the one terminal of each of the plurality of switches and one of the two terminals of the energy absorber in a polarity so as to allow a current to flow from the one terminal of the switch to the one terminal of the energy absorber, a second diode connected between the one terminal of each of the plurality of switches and the other terminal of the energy absorber in a polarity so as to allow a current to flow from the other terminal of the energy absorber to the one terminal of the switch, and a circuit connecting the other terminal of the energy absorber to the common conductor.

10 Claims, 5 Drawing Sheets

DC POWER SUPPLY CIRCUIT ARRANGEMENT

BACKGROUND OF THE INVENTION

1. Field of the Invention

The present invention relates to a DC power supply circuit arrangement, and more particularly to an arrangement of an energy absorber used in a DC circuit breaker.

2. Description of the Related Art

A conventional DC power supply circuit composed of commutation type DC circuit breakers is disclosed in Japanese Patent Unexamined Publication JP-A-54-113038. As apparent from the Publication, energy absorbers are connected in parallel with respective circuit breakers. This arrangement is now described with reference to FIG. 3.

FIG. 3 is a circuit diagram showing part of a DC power supply circuit for a feeder used in an electric railway. A common conductor 1 is connected at its one side through circuit breakers 2A to 2C and AC-to-DC converting rectifiers 3A to 3C to a three-phase AC power source (not shown) and connected at its other side to switches 4A to 4E. The switches 4A to 4E, which may be unidirectional semiconductor switches through which a current can flow only in the direction of arrow, are connected in parallel with energy absorbers 6A to 6E formed of a non-linear resistor or a condenser. Output ends of the switches 4A and 4C are connected to an M-route feeder 30 and output ends of the switches 4B and 4D are connected to an N-route feeder 32 to supply DC power to electric trains or trolley cars through trolley lines in the respective routes.

In the DC power supply circuit, at least one of three circuit breakers 2 is always closed and a DC current flows in the direction of arrow shown by broken line.

If a short-circuit occurs at point A marked with X when one of circuit breakers 2 is closed, a short-circuit current $i_1$ flows through the switch 4A. This short-circuit current is detected by a current transformer (not shown) and the switch 4A is opened to commutate the short-circuit current $i_1$ to the energy absorber 6A. When the short-circuit current is commutated to the energy absorber 6, electric energy is converted into thermal energy to cut off the short-circuit current if the energy absorber is formed of, for example, a non-linear resistor.

Further, if a short-circuit occurs at a point B when a DC current $i_2$ is supplied from an adjacent transformer substation (not shown) through the feeder 32, a short-circuit current flows from the adjacent substation through the feeder 32 and the switch 4E to the point B. When the short-circuit current is detected by a current transformer (not shown) and the switch 4E is opened, the short-circuit current is commutated to the energy absorber 6E and cut off in the same manner as above.

In the DC power supply circuit, however, each of the switches 4A to 4E requires one energy absorber and accordingly the DC power supply circuit is not only large in structure but also expensive.

SUMMARY OF THE INVENTION

It is an object of the present invention to provide a small-sized and inexpensive DC power supply circuit arrangement for supplying DC power from a power source to a load and including a plurality of switches provided between the load and the power source, wherein means for absorbing energy of a current flowing through each of the switches when the switch is turned off is composed of a smaller number of energy absorbers regardless of a direction of current flowing through the switch.

According to a first aspect of the present invention, a DC power supply circuit arrangement for supplying DC power from a power source to a load comprises a common conductor, a plurality of switches each including one terminal connected to the power source and the other terminal connected to the common conductor, first circuit means for connecting the common conductor to the load, energy absorbing means including two terminals, a first diode connected between one terminal of each of the plurality of switches and one of the two terminals of the energy absorbing means such that a current is allowed to flow from the one terminal of the switch to the one terminal of the energy absorbing means, a second diode connected between one terminal of each of the plurality of switches and the other terminal of the energy absorbing means such that a current is allowed to flow from the other terminal of the energy absorbing means to the one terminal of the switch, and second circuit means for connecting the other terminal of the energy absorbing means to the common conductor.

According to a second aspect of the present invention, a DC power supply circuit arrangement for supplying DC power from a power source to a load comprises a common conductor, a plurality of switches each including one terminal connected to the load and the other terminal connected to the common conductor, first circuit means for connecting the common conductor to the power source, energy absorbing means including two terminals, a first diode connected between one terminal of each of the plurality of switches and one of the two terminals of the energy absorbing means such that a current is allowed to flow from the one terminal of the switch to the one terminal of the energy absorbing means, a second diode connected between one terminal of each of the plurality of switches and the other terminal of the energy absorbing means such that a current is allowed to flow from the other terminal of the energy absorbing means to the one terminal of the switch, a third diode connected between the other terminal of the switch and the one terminal of the energy absorbing means such that a current is allowed to flow from the one terminal of the switch to the one terminal of the energy absorbing means, and second circuit means for connecting the other terminal of the energy absorbing means to the common conductor.

In the DC power supply circuit arrangement of the present invention, one energy absorbing means is used in common for the plurality of switch circuits and the first and second diodes serve to cause the commutation current to flow through the energy absorbing means always in the same direction when the switch is opened due to an overcurrent for any switch circuit and to prevent the short circuit between the switch circuits.

DESCRIPTION OF THE PREFERRED EMBODIMENTS

Figure 1A:
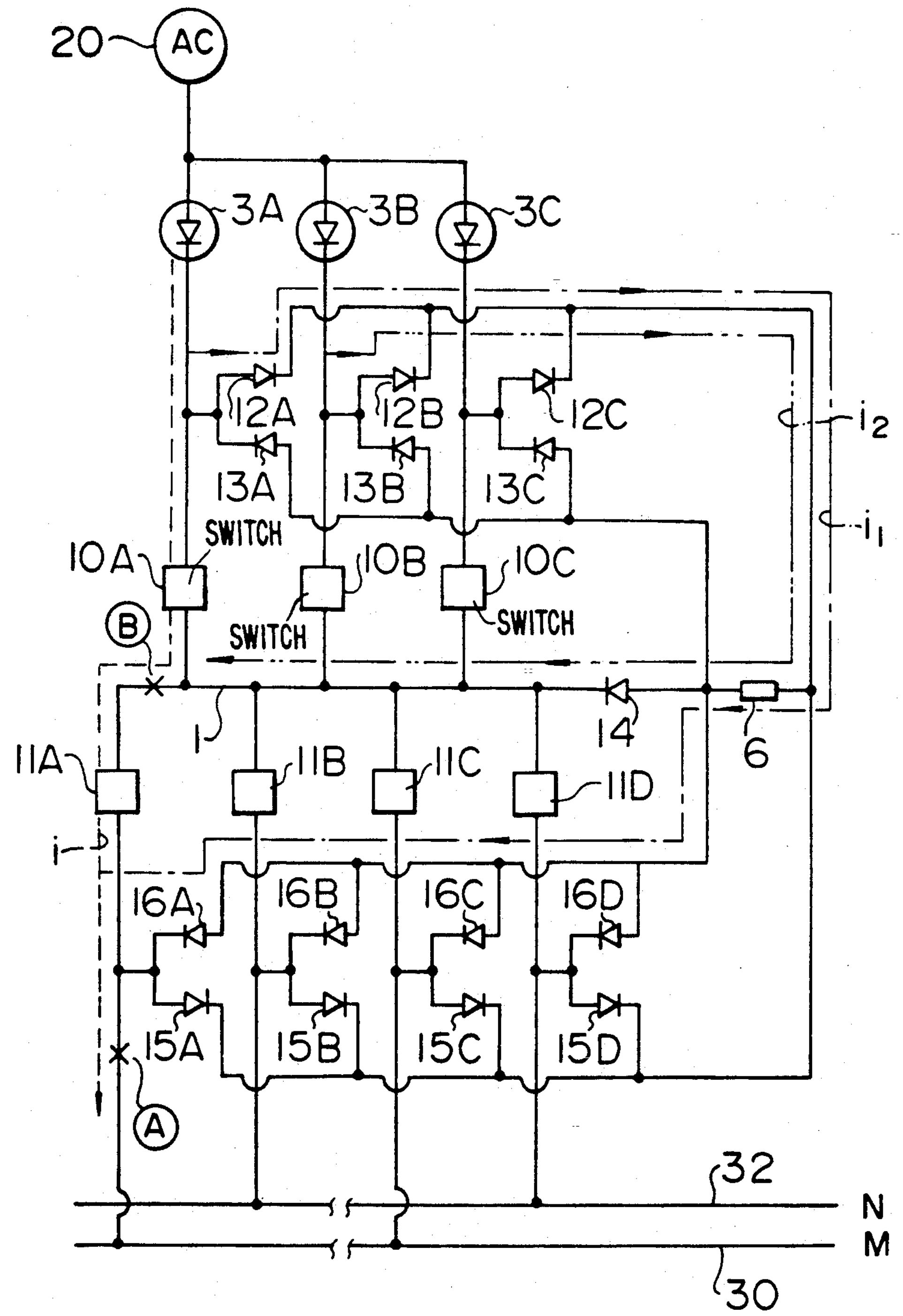
FIGS. 1A and 1B are block diagrams showing an embodiment of a DC power supply circuit arrangement according to the present invention which is applied to a section transformer substation of an electric railway.

A first embodiment of the present invention is now described with reference to FIGS. 1A and 1B. FIG. 1A shows a DC power supply circuit arrangement which supplies DC power from an AC power source 20 through a common conductor 1 to feeders 30 and 32 connected to a load. In the embodiment, the power source side of the common conductor 1 is divided into three routes A, B and C and the output side thereof is divided into four routes A, B, C and D. In the following description, corresponding elements included in the respective routes are designated by the same reference numerals and alphabetical indices A to D representative of the respective routes are added to the reference numerals when the route associated with the elements is required to be discriminated.

Numeral 3 denotes an AC-to-DC converter which is connected to the AC power source 20 to receive AC power and produce DC power. Numerals 10 and 11 denote bi-directional switches which may be mechanical switches such as a vacuum circuit breaker or a gas circuit breaker or inverse-parallel connection of unidirectional semiconductor switches having breaking capability. The switch 10 includes an input terminal connected to an output terminal of the AC-to-DC converter 3 and an output terminal connected to the common conductor 1. The switch 11 includes an input terminal connected to the common conductor 1 and an output terminal connected to the feeder 30 or 32. More particularly, the output terminals of the switches 11A and 11C are connected to the M-route feeder 30 and the output terminals of the switches 11B and 11D are connected to the N-route feeder 32 to supply DC power to an electric train through respective trolley lines.

The three routes A, B and C at the side of the power source are selectively used depending on the condition of the load. When the load is heavy, the three switches 10 are all closed to activate the three routes, while when the load is light, two of the switches are opened to activate only one route.

Numeral 6 denotes an energy absorber formed of a non-linear resistor or a condenser.

Numeral 12 denotes a diode which is connected between the input terminal of each of the switches 10 and one terminal of the energy absorber 6 in a polarity such that a current is allowed to flow from the former to the latter. Numeral 13 denotes a diode which is connected between the input terminal of each of the switches 10 and the other terminal of the energy absorber 6 in a polarity such that a current is allowed to flow from the latter to the former.

Numeral 14 denotes a diode which is connected between the common conductor 1 and the other terminal of the energy absorber 6 in a polarity such that a current is allowed to flow from the latter to the former.

On the other hand, numeral 15 denotes a diode which is connected between the output terminal of each of the switches 11 and one terminal of the energy absorber 6 in a polarity such that a current is allowed to flow from the former to the latter. Numeral 16 denotes a diode which is connected between the output terminal of each of the switches 11 and the other terminal of the energy absorber 6 in a polarity such that a current is allowed to flow from the latter to the former.

Operation of the DC power supply circuit of the embodiment is now described.

First, one energy absorber 6 is effectively employed in common for a short-circuit which occurs at any of points A, B, C and D when the DC power supply circuit is operated in the normal state.

(1) If a short-circuit occurs at point A marked with X when the switches 10B and 10C are opened and only the switch 10A is closed so that a normal DC current i flows in the direction shown by broken line, a short-circuit current flows through the bi-directional switches 10A and 11A. This short-circuit current is detected by a DC current transformer (not shown). Consequently, when the bi-directional switch 10A or switches 10A and 11A are opened, the short-circuit current is commutated to the energy absorber 6 through the diodes 12A and 16A as shown by one-dot chain line $i_1$. Accordingly, the short-circuit energy of the DC circuit can be absorbed by the energy absorber 6 to cut off the short-circuit current.

(2) If a short-circuit occurs at point B marked with X when the normal DC current i flows in the direction of broken line, a short-circuit current flows through the bi-directional switch 10A and the switch 10A is opened. A short-circuit current is commutated to the energy absorber 6 through the diodes 12A and 14 as shown by two-dot chain line $i_2$ to absorb short-circuit energy so that the short-circuit current is cut off.

The foregoing description is made of the case where only the A-route switch 10A is closed. It will be understood that, when two or more routes are activated, superposed short-circuit currents flowing through the respective active routes are commutated to the energy absorber 6.

Figure 1B:
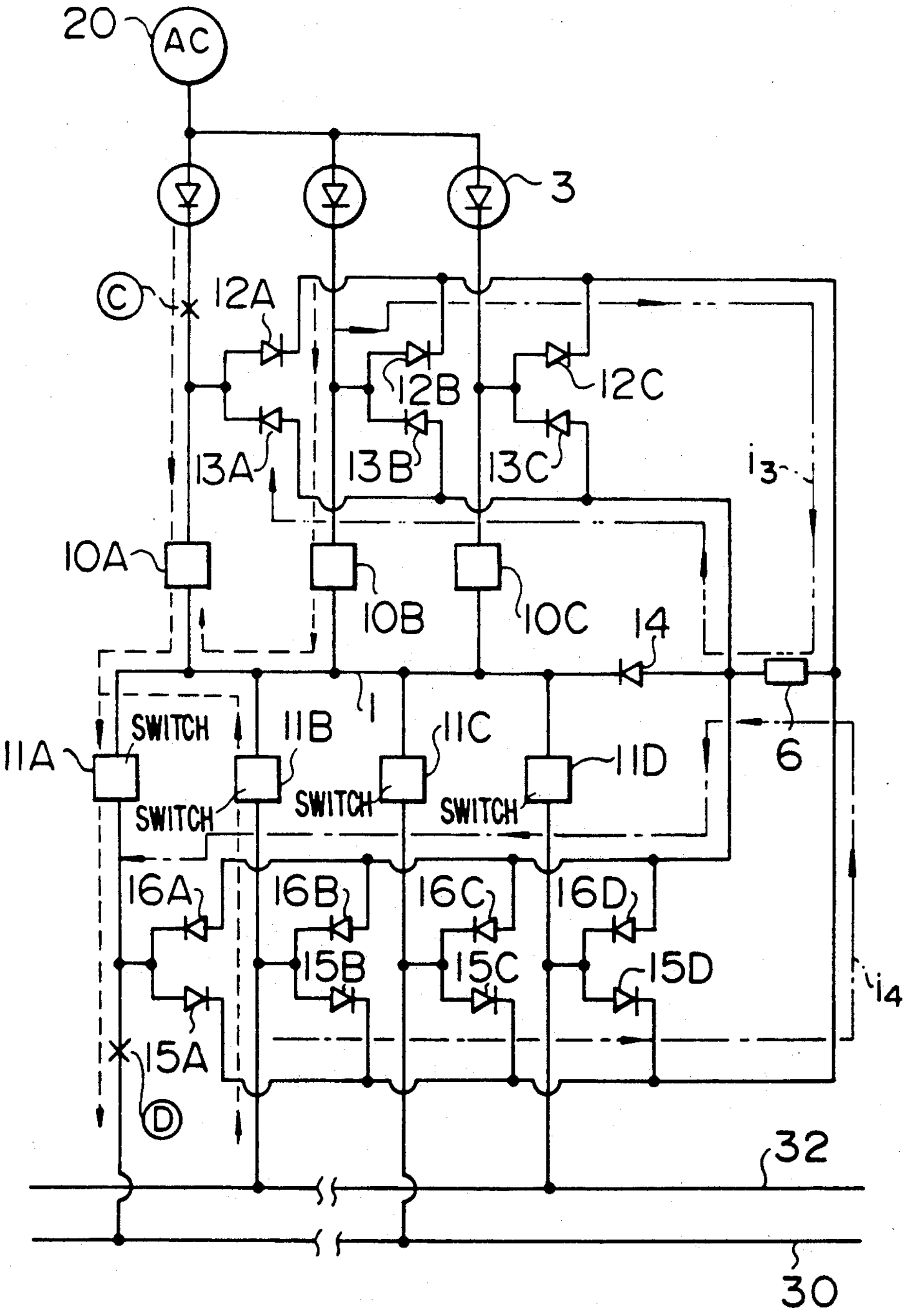

(3) If a short-circuit occurs at point C marked with X as shown in FIG. 1B when the bi-directional switches 10A and 10B are closed, a short-circuit current flows through the switches 10B and 10A. When the switch 10B only or both of the switches 10A and 10B are opened upon detection of the short-circuit current, the short-circuit current is commutated to the energy absorber 6 through the diodes 12B and 13A so that short-circuit energy of the DC circuit is absorbed by the energy absorber to cut off the short-circuit current.

(4) When all of the switches 10A, 10B and 10C are opened and DC power is supplied from an adjacent transformer substation through the feeder 32 to the feeder 30, a DC current flows through the bi-directional switches 11B and 11A as shown by broken line of FIG. 1B. In this state, if a short-circuit occurs at point D marked with X, a short-circuit current flows from the adjacent substation through the feeder 32, the switches 11B and 11A to the point D. When the short-circuit current is detected and the bi-directional switch 11A or both of the switches 11A and 11B are opened, the short-circuit current is commutated through the diodes 15B and 16A to the energy absorber 6 as shown by one-dot chain line $i_4$ and short-circuit energy of the DC circuit is absorbed by the energy absorber to cut off the short-circuit current.

Figure 2A:
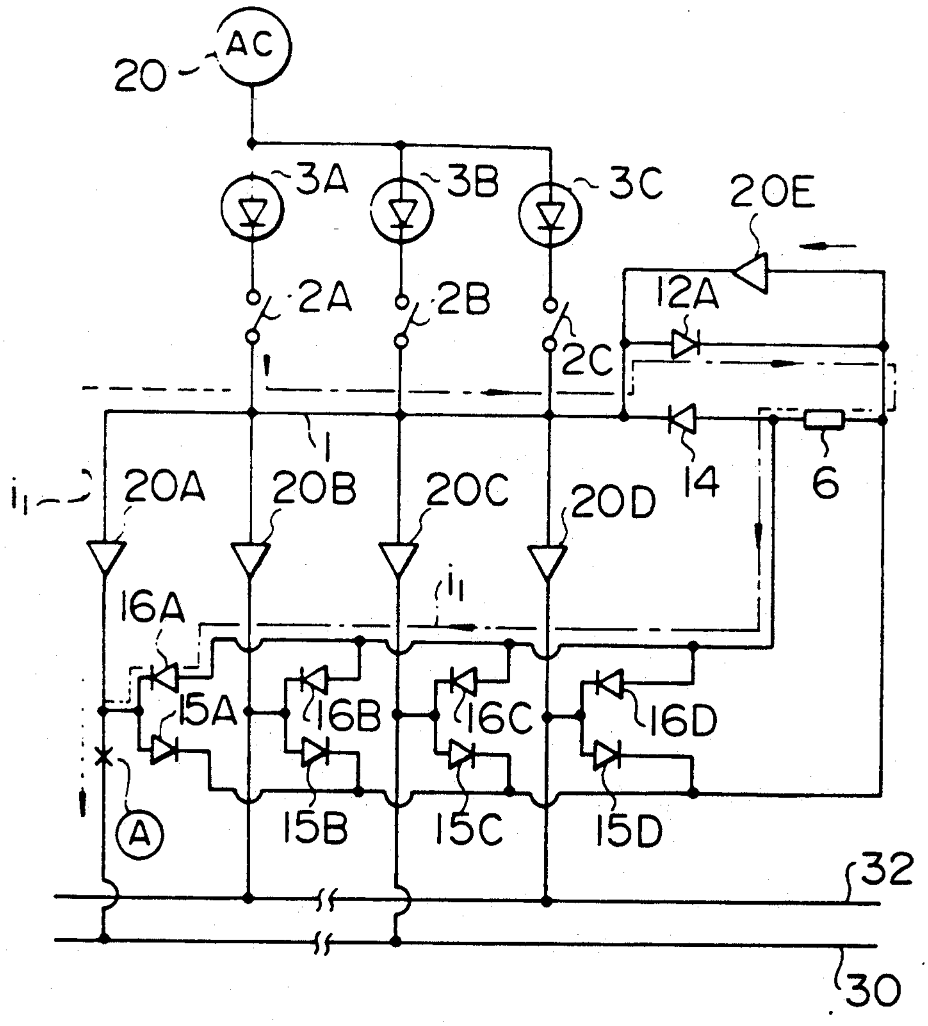
FIGS. 2A and 2B are block diagrams showing another embodiment of a DC power supply circuit arrangement according to the present invention which is applied to a section transformer substation of an electric railway.
Figure 2B:
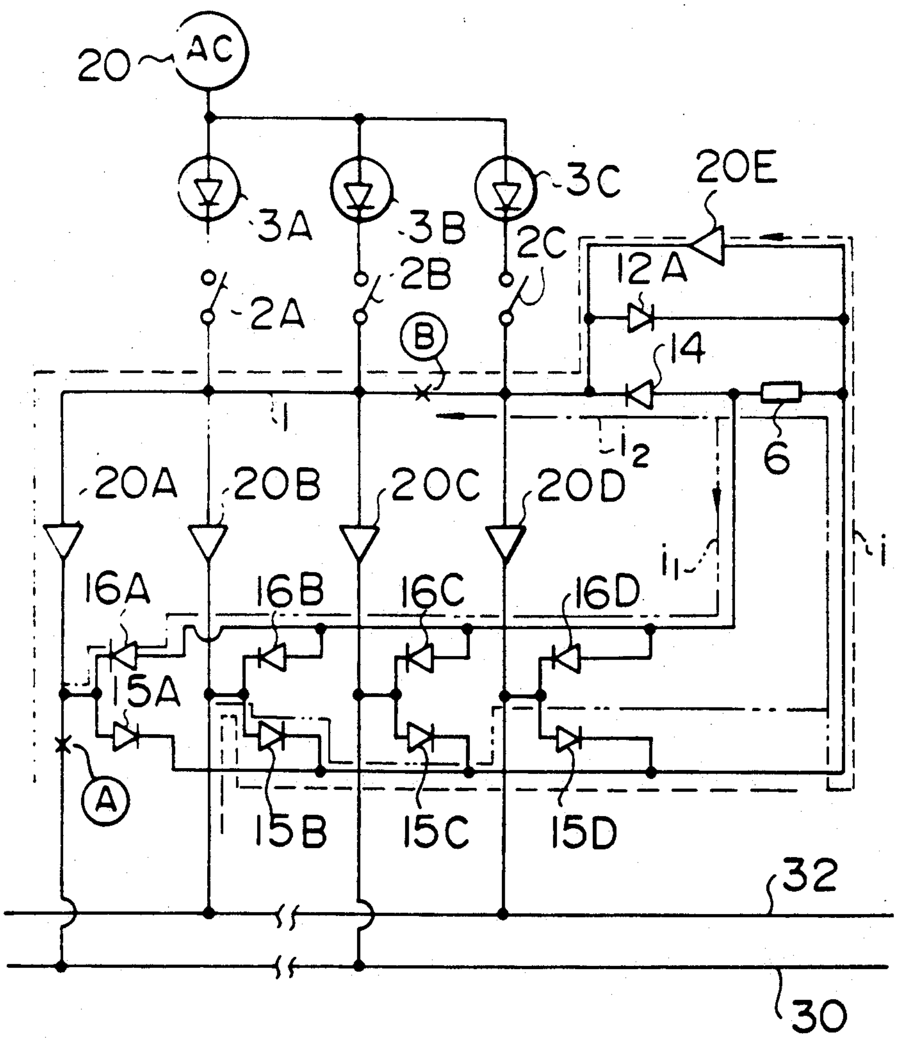
Figure 3:
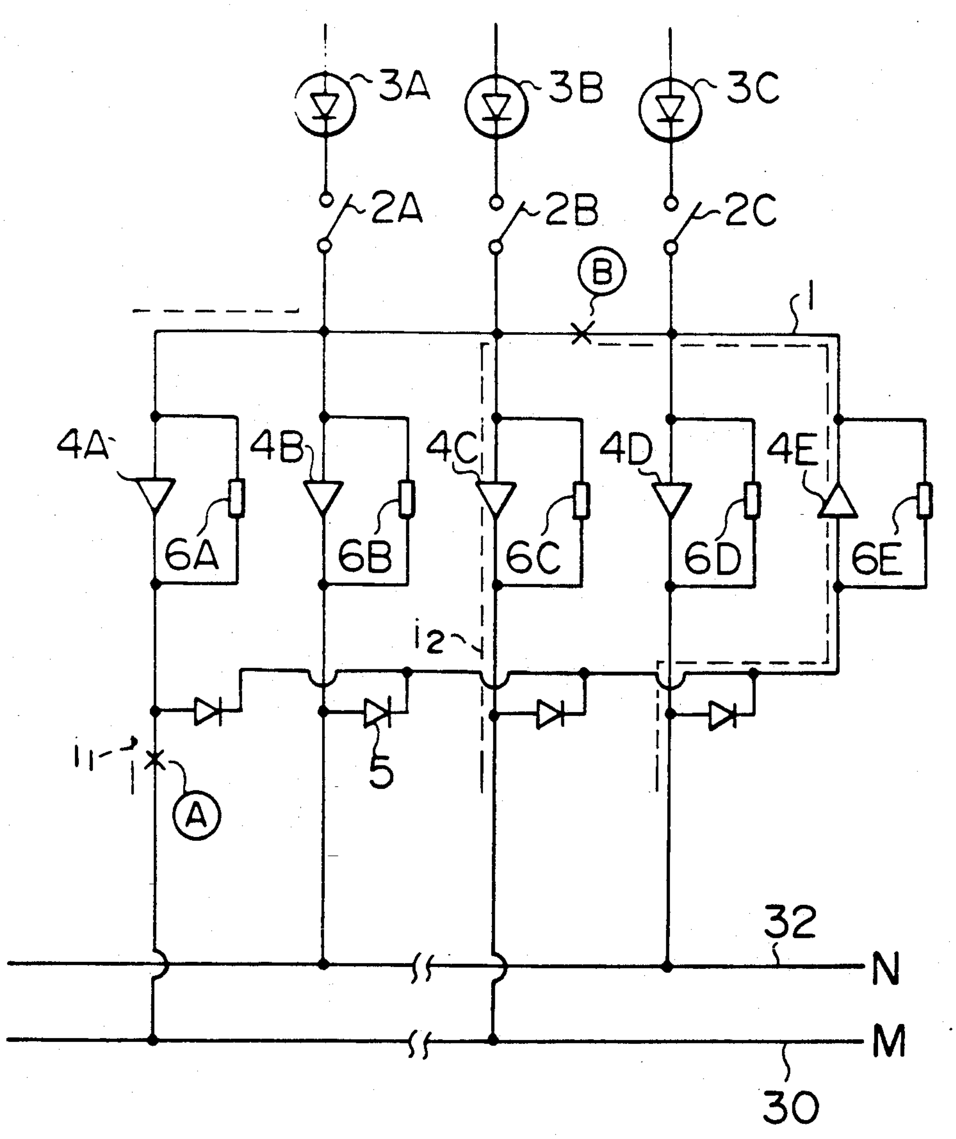
FIG. 3 PRIOR ART
FIG. 3 is a block diagram of a conventional DC power supply circuit arrangement.

A second embodiment of the present invention is now described with reference to FIGS. 2A and 2B. In FIGS. 2A and 2B, like elements to those of FIGS. 1A and 1B are designated by the same reference numerals.

The second embodiment is the same as the embodiment of FIGS. 1A and 1B in the circuit configuration at the load side of the common conductor except that switches 20A, 20B and 20C connecting the common conductor to the load are unidirectional semiconductor switches which allow a current to flow only in the direction from the common conductor 1 to the load and a unidirectional semiconductor switch 20E and a diode 12A are connected in a polarity as shown in the figure. More particularly, the second embodiment comprises a diode 15 connected between the output terminal of each of the switches 20 and one terminal of the energy absorber 6 to allow a current to flow from the former to the latter, a diode 16 connected between the output terminal of each of the switches 20 and the other terminal of the energy absorber 6 to allow a current to flow from the latter to the former, and a diode 14 connected between the other terminal of the energy absorber 6 and the common conductor 1 to allow a current to flow from the former to the latter. The unidirectional switch 20E is used for supplying a DC power received from the adjacent substation through the feeder 32 to the feeder 30 and connected between one terminal of the energy absorber 6 and the common conductor 1 to allow a current to flow from the former to the latter. When this substation comes to a standstill due to any reason, the switches 2A, 2B and 2C are opened and DC power received from the adjacent substation through the feeder 32 and the diode 15B is fed to the feeder 30 through the switch 20E, the common conductor 1 and the switch 20A. A diode 12A provides a commutation circuit for a short-circuit current so as to allow a current to flow from the common conductor 1 through one terminal of the energy absorber 6 to the other terminal thereof and also prevents a current from flowing through the circuit reversely.

It is assumed that this substation is on operation and receives no electric power from any adjacent substation and the switch 2A is closed with the switches 2B and 2C opened. In this case, a DC current i flows through the switches 2A and 20A to the load at the normal state as shown by broken line of FIG. 2A. If a short-circuit occurs at point A marked with X and a short-circuit current flows, the short-circuit current is detected by a current transformer (not shown) and the switch 20A is opened. The short-circuit current $i_1$ is commutated to a circuit including the switch 2, the diode 12A, the energy absorber 6 and the diode 16A as shown by one-dot chain line and short-circuit energy is cut off by the energy absorber. Further, when two of the switches 2A, 2B and 2C are closed, short-circuit currents flowing through the respective closed switches are superposed and commutated to flow through the energy absorber.

When the substation comes to a standstill and DC power is supplied from the adjacent substation through the feeder 32, the DC power is fed to the feeder 30 through the feeder 32, the diode 15B, the switches 20E and 20A in the normal state as shown by broken line in FIG. 2B. If a short-circuit occurs at point A, a short-circuit current flows through the same circuit as the above. When the short-circuit current is detected and the switch 20E and/or 20A are opened, the short-circuit current is commutated to a circuit including the diode 15B, the energy absorber 6 and the diode 16A and short-circuit energy is cut off by the energy absorber. Further, when a short-circuit occurs at point B, a short-circuit current flows through the feeder 32, the diode 15B and the switch 20E. When the short-circuit current is detected and the switch 20E is opened, the short-circuit current is commutated to a circuit including the diode 15B, the energy absorber 6 and the diode 14 so that short-circuit energy is cut off by the energy absorber. As described above, in any case, the short-circuit current flows through the energy absorber from the right terminal to the left terminal thereof in the figure and short-circuit energy thereof is absorbed and cut off by the energy absorber.

The second embodiment has been described as using the unidirectional semiconductor switches, for example, such as thyristors in the main circuit. However, bi-directional semiconductor switches, for example, such as bi-directional controlled rectifier elements can be employed in the same manner as the switches of FIGS. 1A and 1B. The bi-directional controlled element may be, for example, a single triac, or an inverse-parallel connection of thyristors, diodes or GTO semiconductor elements.

As described above, according to the present invention, since a single energy absorber 6 can be employed for providing a commutation circuit commonly to the plurality of bi-directional switches or unidirectional switches, the DC power supply circuit can be made small in size at reduced cost.

In the prior art, since the energy absorber is required for each switch, many energy absorbers having small capacity are used, so that there is a high possibility of occurrence of dielectric breakdown of the energy absorbers due to a short-circuit current. In the present invention, however, since the necessary number of the energy absorbers is reduced, a small number of energy absorbers having large capacity can be used so that the dielectric breakdown thereof hardly occurs and the life of the energy absorber can be extended. Further, the reliability for the life of the DC power supply circuit can be remarkably improved.

We claim:

1. A DC power supply circuit arrangement for supplying DC power from a power source to a load, comprising:
   - a common conductor;
   - a plurality of switches each having one terminal directly connected to the power source and the other terminal directly connected to said common conductor;
   - first circuit means for connecting said common conductor to the load;
   - energy absorbing means having two terminals;
   - first diode means connected between the one terminal of each of said plurality of switches and one of the two terminals of said energy absorbing means in a polarity so as to allow a current to flow from the one terminal of a respective switch to the one terminal of said energy absorbing means;
   - second diode means connected between the one terminal of each of said plurality of switches and the other terminal of said energy absorbing means in a polarity so as to allow a current to flow from the other terminal of said energy absorbing means to the one terminal of said respective switch; and
   - second circuit means for connecting the other terminal of said energy absorbing means to said common conductor.

2. A DC power supply circuit arrangement according to claim 1, wherein said first circuit means comprises a plurality of second switches each having one terminal connected to the load and the other terminal connected to said common conductor, and said DC power supply circuit arrangement further comprises a third diode connected between the one terminal of each of said second switches and the one terminal of said energy absorbing means in a polarity so as to allow a current to flow from the one terminal of the second switch to the one terminal of said energy absorbing means and a fourth diode connected between the one terminal of each of said second switches and the other terminal of said energy absorbing means in a polarity so as to allow a current to flow from the other terminal of said energy absorbing means to the one terminal of the second switch.

3. A DC power supply circuit arrangement according to claim 2, wherein said second circuit means comprises a fifth diode connected between the other terminal of said energy absorbing means and said common conductor in a polarity so as to allow a current to flow from the former to the latter.

4. A DC power supply circuit arrangement according to claim 1, wherein said plurality of switches are of vacuum circuit breaker type.

5. A DC power supply circuit arrangement according to claim 1, wherein said plurality of switches are of gas circuit breaker type.

6. A DC power supply circuit arrangement for supplying DC power from a power source to a load, comprising:

a common conductor;

a plurality of switches each having one terminal directly connected to the load and the other terminal directly connected to said common conductor;

first circuit means for connecting said common conductor to the power source;

energy absorbing means having two terminals;

first diode means connected between the one terminal of each of said plurality of switches and one of the two terminals of said energy absorbing means in a polarity so as to allow a current to flow from the one terminal of a respective switch to the one terminal of said energy absorbing means;

second diode means connected between the one terminal of each of said plurality of switches and the other terminal of said energy absorbing means in a polarity so as to allow a current to flow from the other terminal of the respective switch;

a third diode connected between the common conductor and the one terminal of said energy absorbing means in a polarity so as to allow a current to flow from the common conductor to the one terminal of said energy absorbing means; and second circuit means for connecting the other terminal of said energy absorbing means to said common conductor.

7. A DC power supply circuit arrangement according to claim 6, wherein each of said switches is a unidirectional switch, and said DC power supply circuit arrangement further comprises a second switch connected between the one terminal of said energy absorbing means and said common conductor.

8. A DC power supply circuit arrangement according to claim 6, wherein said second circuit means comprises a fifth diode connected between the other terminal of said energy absorbing means and said common conductor in a polarity so as to allow a current to flow from the former to the latter.

9. A DC power supply circuit arrangement according to claim 6, wherein each of said plurality of switches is of vacuum circuit breaker type.

10. A DC power supply circuit arrangement according to claim 6, wherein each of said plurality of switches is of gas circuit breaker type.

* * * * *